(12) United States Patent
Makino et al.

(10) Patent No.: US 7,667,879 B2
(45) Date of Patent: Feb. 23, 2010

(54) IMAGE READING APPARATUS AND IMAGE FORMING APPARATUS

(75) Inventors: Yuichi Makino, Ibaraki (JP); Yuji Yamanaka, Ibaraki (JP); Koji Nagano, Ibaraki (JP)

(73) Assignees: Canon Kabushiki Kaisha, Tokyo (JP); Canon Finetech Inc., Ibaraki (JP)

( * ) Notice: Subject to any disclaimer, the term of this patent is extended or adjusted under 35 U.S.C. 154(b) by 974 days.

(21) Appl. No.: 10/792,735

(22) Filed: Mar. 5, 2004

(65) Prior Publication Data

US 2004/0207887 A1 Oct. 21, 2004

(30) Foreign Application Priority Data

Mar. 7, 2003 (JP) .............................. 2003-062098
Feb. 13, 2004 (JP) .............................. 2004-036774

(51) Int. Cl.
*H04N 1/04* (2006.01)
*G03G 15/00* (2006.01)

(52) U.S. Cl. .................. 358/498; 358/496; 358/474; 399/396

(58) Field of Classification Search ............ 358/498, 358/496, 474; 399/396, 367–380; 271/3.01, 271/3.05, 3.08, 3.14, 4.01, 6, 7
See application file for complete search history.

(56) References Cited

U.S. PATENT DOCUMENTS

| | | | | |
|---|---|---|---|---|
| 4,970,606 A | * | 11/1990 | Shima ..................... | 358/474 |
| 5,168,310 A | * | 12/1992 | Hayashi et al. ............ | 358/496 |
| 5,438,435 A | * | 8/1995 | Lawniczak ................ | 358/496 |
| 5,488,464 A | * | 1/1996 | Wenthe et al. ............ | 399/396 |
| 5,764,382 A | * | 6/1998 | Shiraishi ................. | 358/496 |
| 5,847,838 A | * | 12/1998 | Takashimizu ............. | 358/496 |
| 6,674,991 B2 | * | 1/2004 | Makino et al. ............ | 399/374 |
| 7,145,698 B2 | * | 12/2006 | Yamamoto ................ | 358/498 |
| 7,196,827 B2 | * | 3/2007 | Yamanaka ................ | 358/496 |
| 7,202,983 B2 | * | 4/2007 | Yokota et al. ............. | 358/496 |
| 7,317,561 B2 | * | 1/2008 | Makino et al. ............ | 358/496 |
| 7,320,462 B2 | * | 1/2008 | Takamatsu ............... | 271/3.14 |
| 2003/0043410 A1 | | 3/2003 | Fukawa et al. ............ | 358/2.1 |

FOREIGN PATENT DOCUMENTS

| | | |
|---|---|---|
| JP | 06-291938 | 10/1994 |
| JP | 2001-066713 | 3/2001 |
| JP | 2002-152460 | 5/2002 |
| JP | 2002-232642 | 8/2002 |
| JP | 2002-232643 | 8/2002 |

OTHER PUBLICATIONS

U.S. Appl. No. 10/781,886, filed Feb. 20, 2004, Makino et al.

* cited by examiner

*Primary Examiner*—Houshang Safaipour
(74) *Attorney, Agent, or Firm*—Fitzpatrick, Cella, Harper & Scinto (57) ABSTRACT

The present invention is to provide an image reading apparatus reading image information of an original while moving the original on an original base plate comprising: a transport rotary member provided opposite the original base plate to transport the original; a supporting member that supports the transport rotary member to be rotatable; and a gap forming section provided in the supporting member to form a gap between the transport rotary member and the original base plate, wherein the transport rotary member and the supporting member each have a high reflectance surface condition.

12 Claims, 9 Drawing Sheets

PRIOR ART

F I G. 9

IMAGE READING APPARATUS AND IMAGE FORMING APPARATUS

BACKGROUND OF THE INVENTION

1. Field of the Invention

The present invention relates to an image reading apparatus for reading images formed on sheet originals, such as a scanner, a copying machine, a printer, and a facsimile machine. The present invention further relates to an image forming apparatus having the image reading apparatus.

2. Description of the Related Art

Conventionally, image reading apparatuses each provided in an apparatus, such as a digital copying machine, a printer, or a facsimile machine, includes those of the type that has an auto document feeder (ADF), which is an example of sheet automatic feeders, mounted to be openable/closable therein to automatically feed sheet originals to the image reading apparatus.

Reading techniques of the image reading apparatus having the ADF include those of the type that reads an image on an original automatically fed by the ADF in the following manner. A reading unit provided below the ADF is moved by a motor to a preset position and stopped. Thereafter, the original fed at a predetermined speed is scanned using light emitted by a lamp unit, and light reflected off therefrom is detected by the reading unit to read the image (the read hereinbelow will be referred to as a "motional read."

Figure 8:
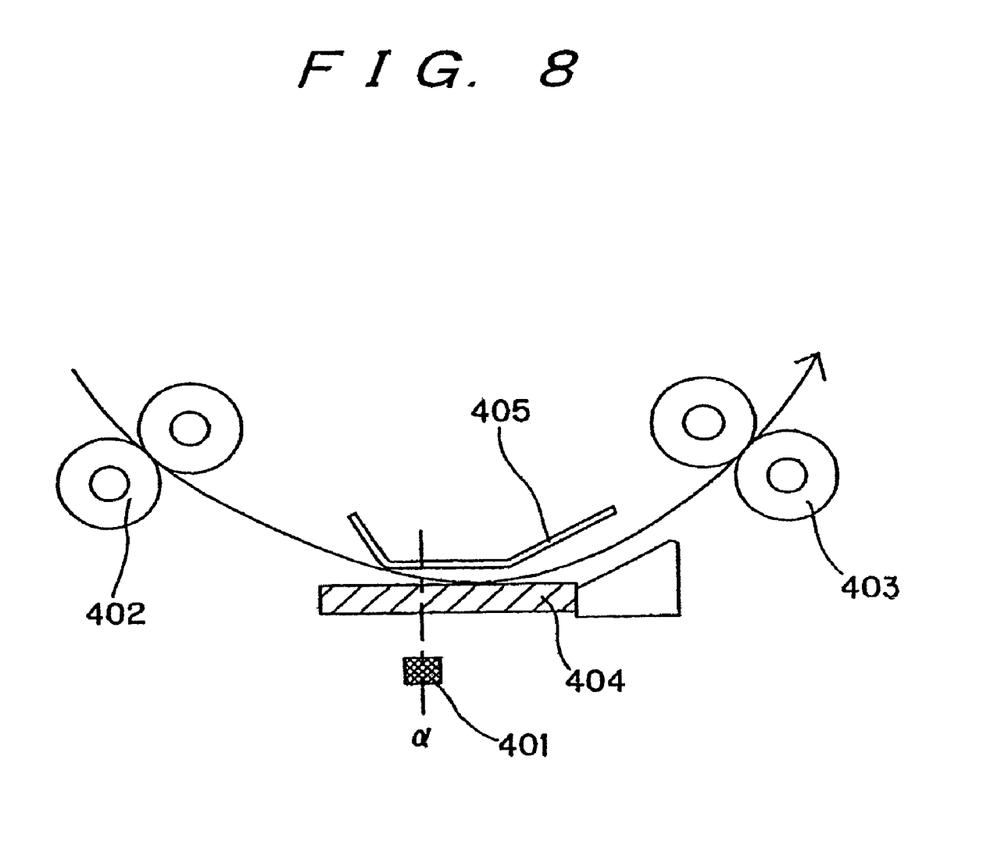
FIG. 8 is a view for explaining a prior art.
Figure 9:
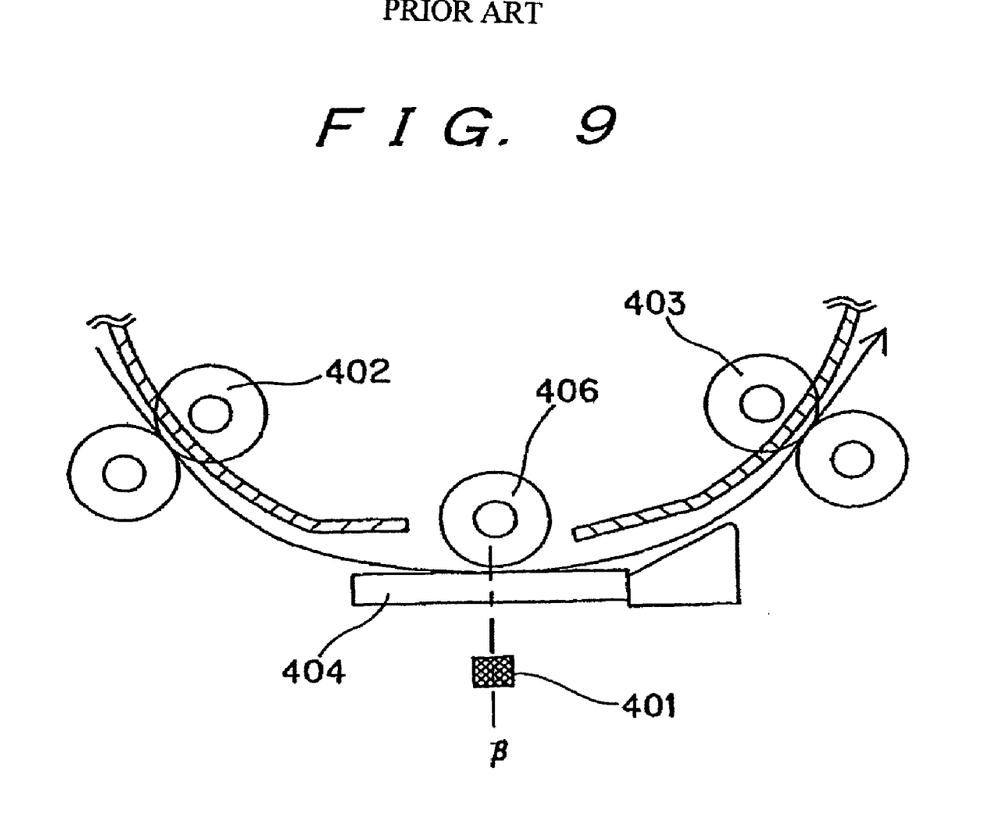
FIG. 9 is a view for explaining a prior art.

FIGS. 8 and 9 each show configurations near a read position of a conventional ADF that employs the motional read.

The configuration shown in FIG. 8 has transport roller pairs (402 and 403) disposed, respectively, on an upstream side and a downstream side of a read position α. In addition, the configuration has a platen glass 404 provided as an original base plate substantially on an upper portion of the read position α, and a guide member 405 that forms a predetermined gap with the platen glass 404. While an original P is restrained by the gap, a reading unit 401 is moved to the read position α, and the original P is transported at a predetermined speed over he reading unit 401 positioned at the read position α. In this manner, speed variations during original transport are restrained, and the image read is performed.

FIG. 9 shows another configuration that, in lieu of the guide member 405, has a platen roller 406 rotatable by driving means (not shown). In this configuration, an original is transported while being pressed against the platen glass 404 with a gap narrower than the gap between the guide member 405 and the platen glass 404.

Patent Document 1: Japanese Patent Application Laid-Open (JP-A) No. 6-291938;
Patent Document 2: JP-A No. 2001-066713; and
Patent Document 3: JP-A No. 2002-232643.

However, in the prior art described above, problems as described below take place.

In the configuration shown in FIG. 8, the guide member 405 has a sliding resistance during the original transport, so that the gap between the guide member 405 and the platen glass 404 should be at least about 1 mm. This gap causes the original P to be bent and transported in the bent state. As such, light quantity reduces in a portion where the sheet floats from the platen glass 404 in the bent portion. This reduces the readable region having a luminance level suitable for reading. For this reason, in the case the read position a is off the readable region, a case can occur in which image quality is degraded.

Another configuration is shown in FIG. 9. In this configuration, an original P is transported in close contact with a platen roller 406 serving as a transport rotary member, and the original P can be intensively biased onto the platen glass 404 for transport. On the other hand, however, problems arise in the case that the platen roller 406 is designed to have a small curvature in order to implement apparatus miniaturization. Specifically, when a read position β is shifted from the center of the platen roller 406, the original P leaves the platen glass 404. This reduces light quantity, thereby disabling a luminance level suitable for reading to be maintained. As such, the readable region is limited to the vicinity of the center of the platen roller 406. Consequently, as in the case of the guide member 405, when the read position β is shifted from the readable region, a case can occur in which image quality is degraded.

SUMMARY OF THE INVENTION

The present invention is made to solve the problems with the prior arts. An object of the present invention is to stabilize the luminance level in peripheral portions of a reading section and to thereby prevent nonuniformity in image quality in an image reading apparatus that reads images through motional read.

In order to achieve the object, the present invention provides an image reading apparatus for reading image information of an original while moving the original on an original base plate, the apparatus comprising: a transport rotary member provided opposite the original base plate to transport the original; a supporting member that supports the transport rotary member to be rotatable, wherein the transport rotary member and the supporting member each have a high reflectance surface condition.

Since both the transport rotary member and the supporting member have a high reflectance surface condition, it is possible to avoid problems in that the light quantity is reduced as an original is shifted from the center of the transport rotary member to an extent of leaving the original base plate. This occurs for such a reason that the original being transported in close contact with the transport rotary member follows the curvature of the member. Accordingly, it is possible to prevent nonuniformity in image quality by stabilizing the luminance level in peripheral portions of the read position and to enlarge the readable region.

DETAILED DESCRIPTION OF THE INVENTION

With reference to the accompanying drawings, preferred embodiments of the present invention will be described in detail hereinbelow. The dimensions, materials, shapes, and relative dispositions, and the like factors of components of the described embodiments change depending on the constructions of the inventive apparatuses and/or devices and various application conditions. The embodiments presented hereinbelow do not mean to restrict the scope of the present invention.

Figure 1:
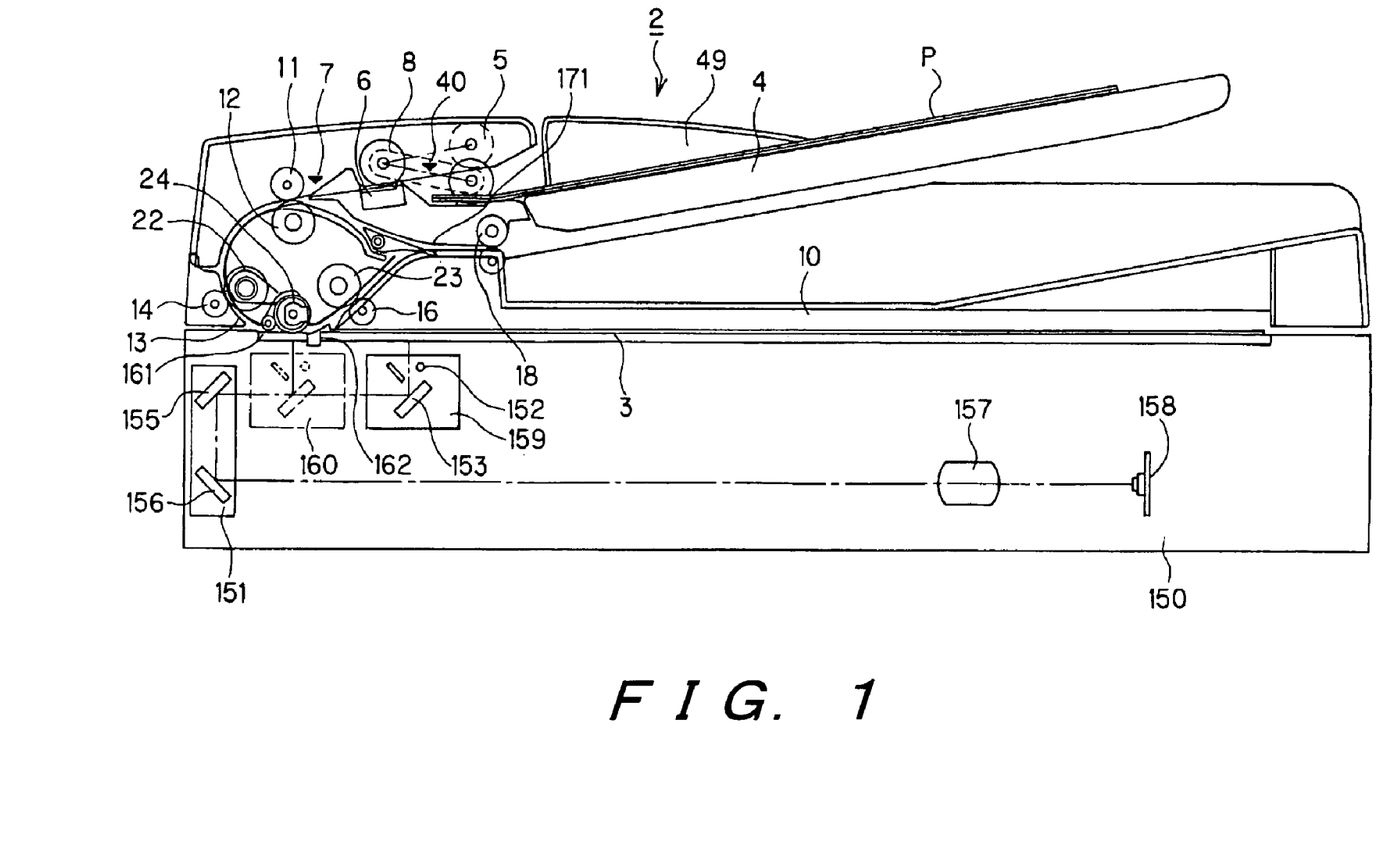
FIG. 1 is a schematic cross-sectional view showing an image reading apparatus according to an embodiment of the present invention.
Figure 2:
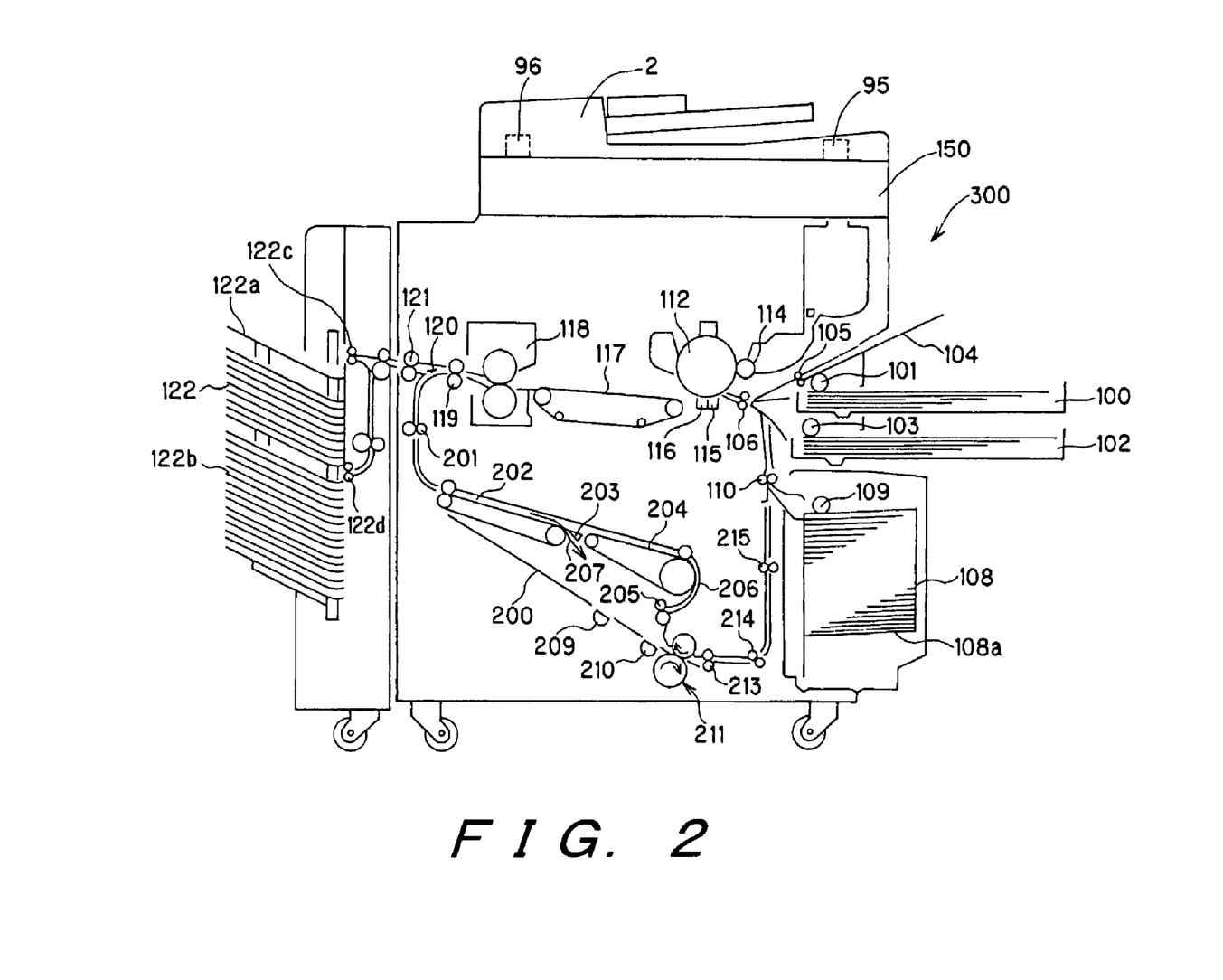
FIG. 2 is a schematic view showing a copying machine as an embodiment of an image forming apparatus including the image reading apparatus according to the embodiment.
Figure 3:
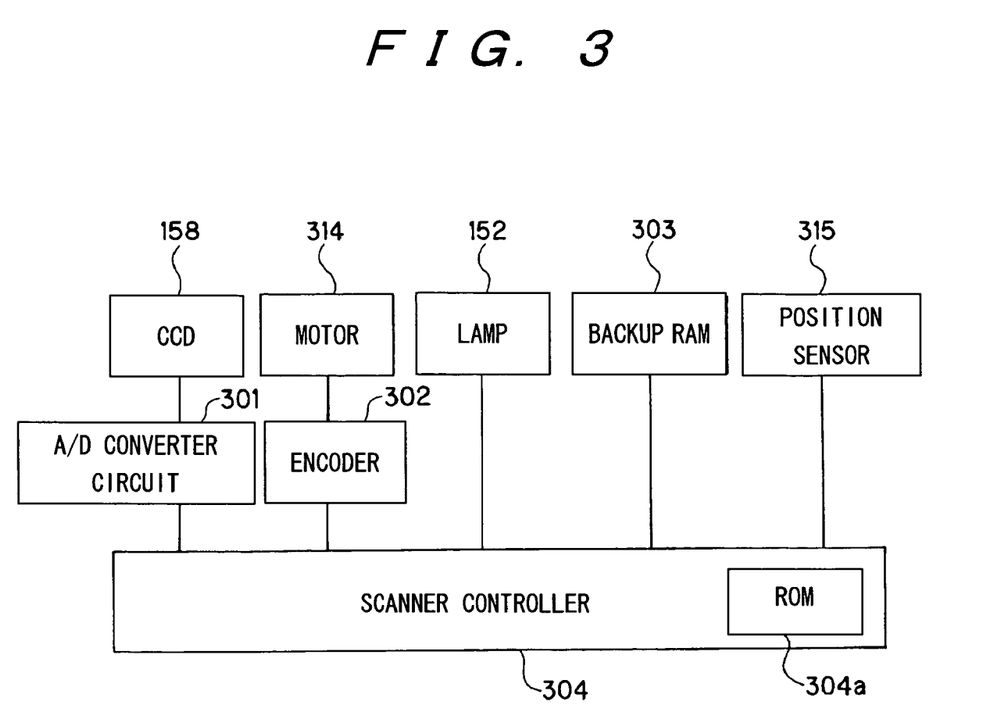
FIG. 3 is a control block diagram showing the image reading apparatus according to the embodiment.
Figure 4:
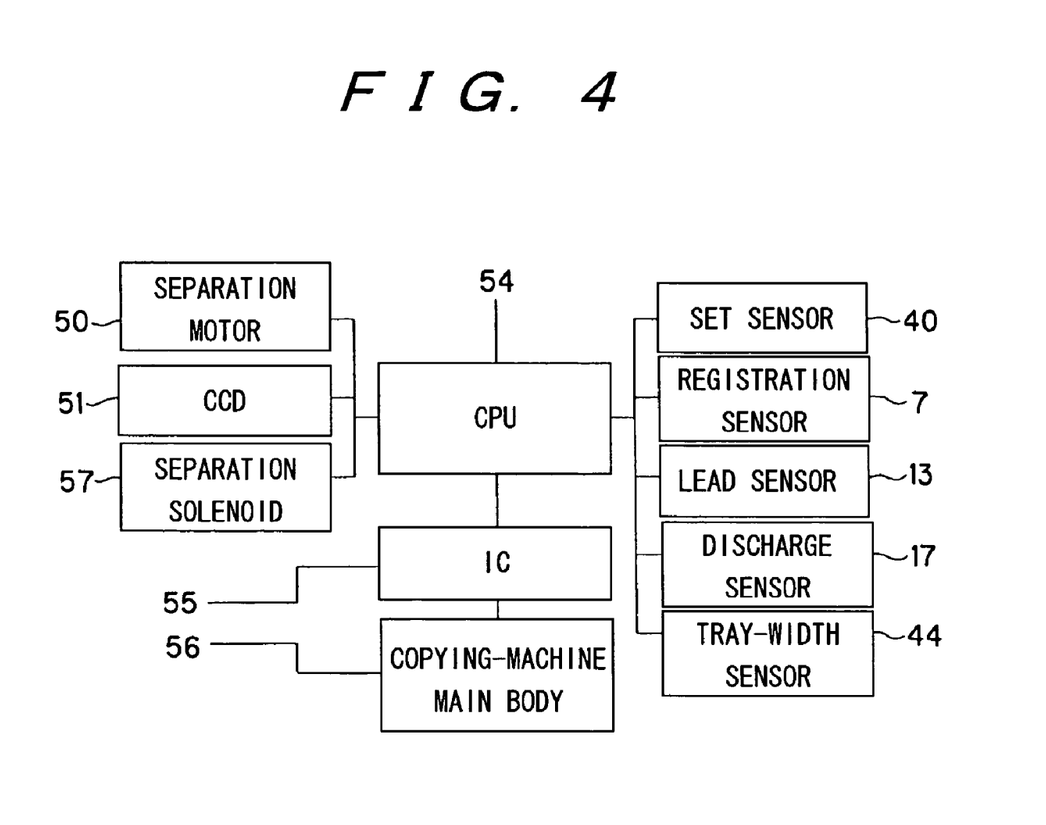
FIG. 4 is a control block diagram showing an auto document feeder 2 (ADF) provided in the image reading apparatus according to the embodiment.
Figure 5:
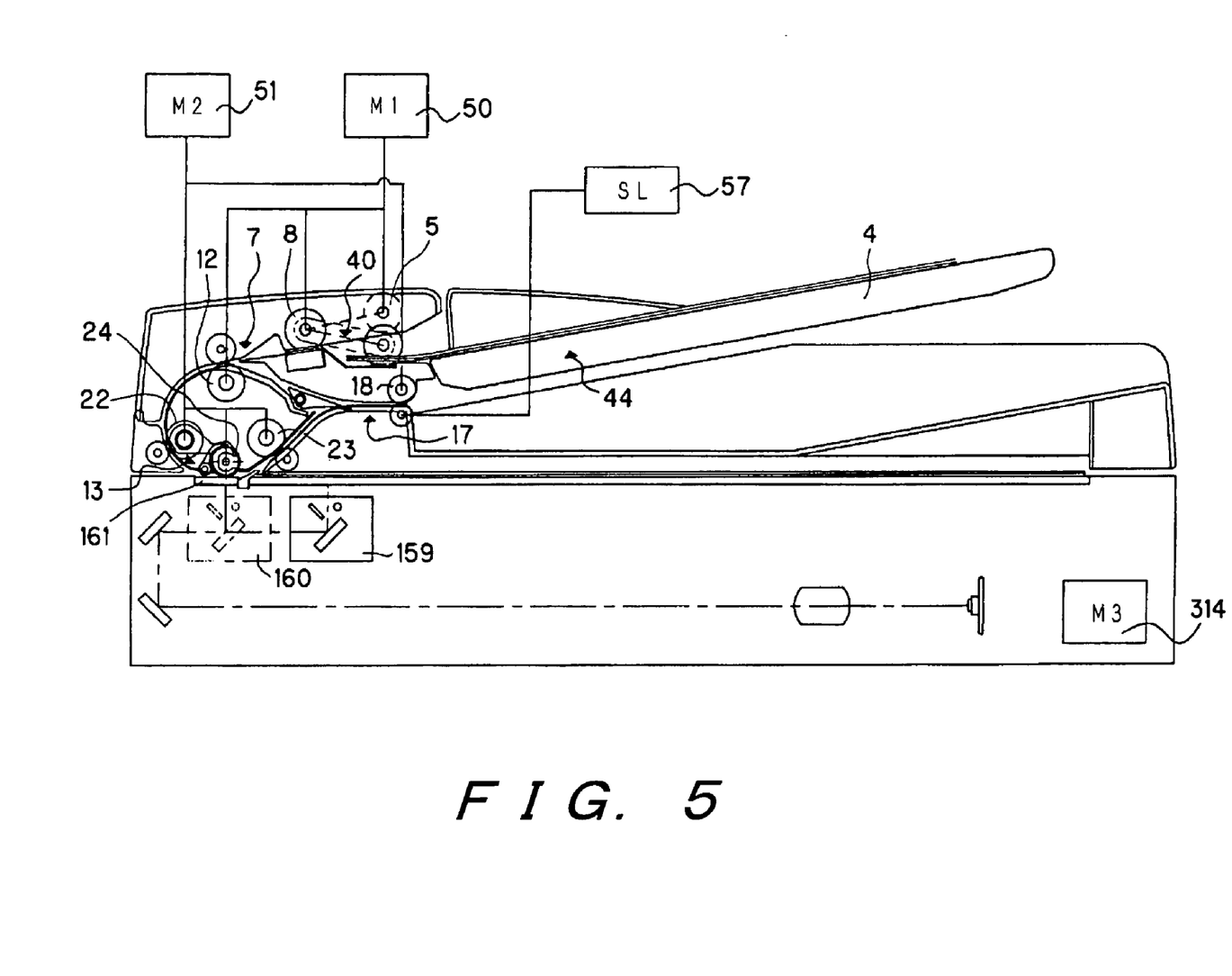
FIG. 5 is a schematic cross-sectional view for explaining a drive system of the ADF provided in the image reading apparatus according to the embodiment.
Figure 6A:
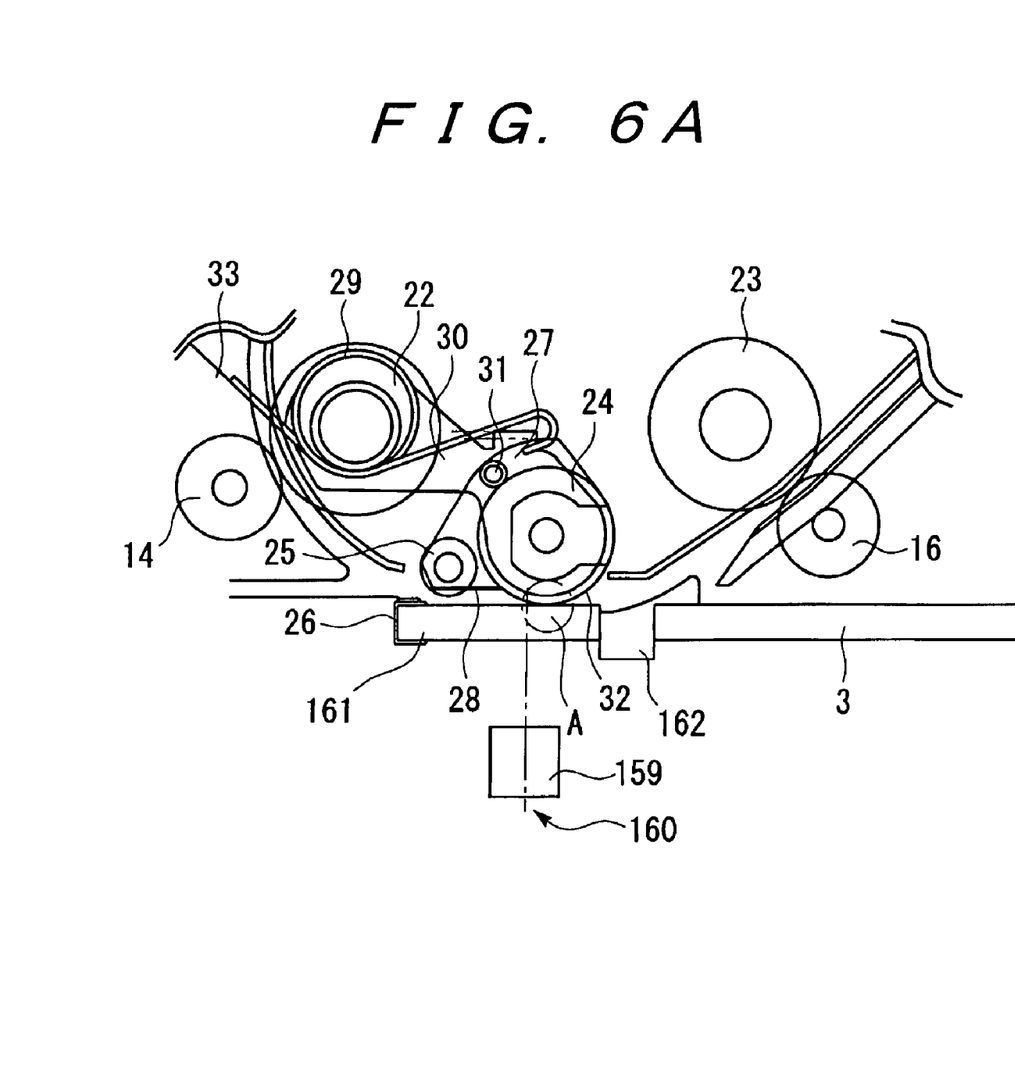
FIG. 6A is a cross-sectional view for explaining the configuration of an original reading section of the image reading apparatus according to the embodiment.
Figure 6B:
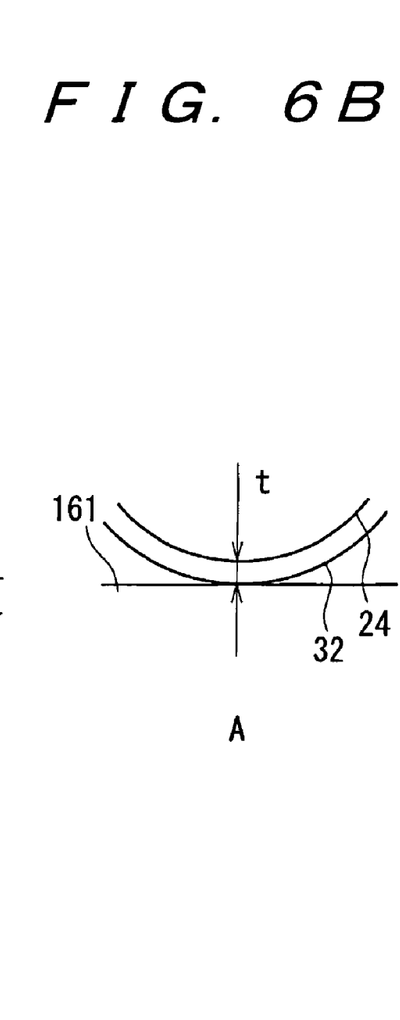
FIG. 6B is an enlarged cross-sectional view for explaining a portion designated by the letter A.
Figure 7:
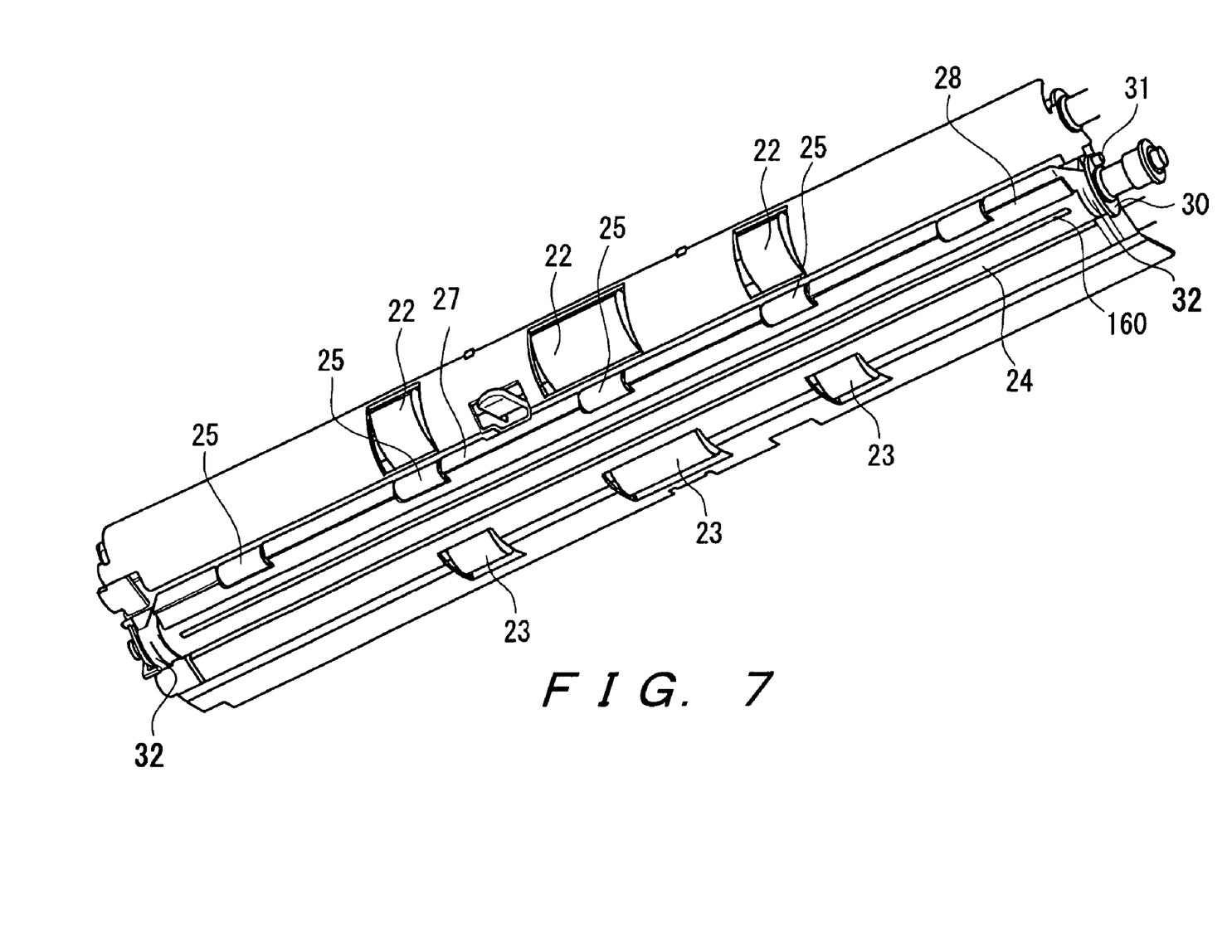
FIG. 7 is a schematic bottom perspective view for explaining the configuration of the original reading section of the image reading apparatus according to the embodiment.

FIG. 1 is a schematic cross-sectional view showing an image reading apparatus according to an embodiment of the present invention. FIG. 2 is a schematic view showing a copying machine as an embodiment of an image forming apparatus including the image reading apparatus according to the embodiment. FIG. 3 is a control block diagram showing the image reading apparatus according to the embodiment. FIG. 4 is a control block diagram showing an auto document feeder (ADF) provided in the image reading apparatus according to the embodiment. FIG. 5 is a schematic cross-sectional view for explaining a drive system of the ADF provided in the image reading apparatus according to the embodiment. FIG. 6A is an enlarged cross-sectional view for explaining the configuration of an original reading section of the image reading apparatus according to the embodiment. FIG. 6B is an enlarged cross-sectional view for explaining a portion designated by the letter A in FIG. 6A. FIG. 7 is a schematic bottom perspective view for explaining the configuration of the original reading section of the image reading apparatus according to the embodiment.

(Apparatus)

In the present embodiment, a copying machine will be described by way of an embodiment of an image forming apparatus. As shown in FIG. 2, the copying machine is configured overall to include a reader section 150, an auto document feeder 2 (ADF), and a printer section 300. An image reading apparatus according to the embodiment is configured overall to include the reader section 150 and the ADF 2.

(Reader Section)

Referring to FIG. 1, the reader section 150 serving as an image reading unit has a lamp 152 for emitting light toward a surface of an original; and mirrors 153, 155, and 156 for leading to a lens 157 and a CCD (charge-connected device) 158 light reflected from the original P and corresponding to the light emitted from the lamp 152. The lamp 152 and the mirror 153 are mounted to a first optical base 159, and mirrors 155 and 156 are mounted to a second optical base 151.

The first and second optical bases 159 and 151 are connected to a motor (M3) 314 (see FIG. 5) via wiring (not shown), and are controlled by rotational driving of the motor 314 to move parallel with an original base glass 3.

A position sensor 315 (see FIG. 3) senses a home position of the first optical base 159. Upon the motor 314 being rotated in the normal or reverse direction with respect to the position of the position sensor 315, the first and second optical bases 159 and 151 move and optically scan an original placed over the original base glass 3.

The motor 314 is a stepping motor. The motor 314 is connected to an encoder 302 (see FIG. 3). The number of pulses corresponding to the motion of each of the first and second optical bases 159 and 151 can be recognized from an output of the encoder 302. That is, the position of each of the first and second optical bases 159 and 151 can be known from encoder pulses provided from the position sensor 315 and the encoder 302.

The light reflected from the original is guided to the lens 157 via the mirrors 153, 155, and 156 and is focused by the lens 157 on the CCD 158. The CCD 158 photoelectrically converts the light reflective of information of the original, and outputs an electronic image signal.

In the configuration described above, the information of the original can be read out in two modes, namely a motional read mode and an original-base-glass read mode. The motional read mode reads the information of the original while the original is being transported by the ADF 2 in the state where the first optical base 159 is stopped at an original read position. The original-base-glass read mode reads the information of the original while the first and second optical bases 159 and 151 are being moved in a sub-scan direction in the state where the original is fixedly placed over the original base glass 3.

An overall configuration of a control system of the reader section 150 will be described hereinbelow with reference to FIG. 3.

The reader section 150 has the lamp 152 for emitting light to the original, the motor 314 for moving the first and second optical bases 159 and 151 (see FIG. 1) in the sub-scan direction for scanning of the original, the CCD 158 serving as a photoelectric converter device that photoelectrically convert light reflected from the surface of the original, an A/D converter circuit 301 for performing A/D conversion of the output signal of the CCD 158, the encoder 302 connected to the motor 314; the position sensor 315 for positioning the first optical base 159 to the home position, a backup RAM 303 and a scanner controller 304 for setting a normal original read position in the ADF original read mode (motional read mode), and a ROM 304a in the scanner controller 304.

Printer Section

The printer section 300 is image forming means using a known electrostatic latent image forming process.

The printer section 300, which serves as the image outputting section, will be described hereunder with reference to FIG. 2.

Numeral 100 denotes an upper cassette, and sheets in the cassette are separated and fed one by one by operation of a separation claw and a sheet feed roller 101. The sheet is guided to a registration roller pair 106. Numeral 102 denotes an lower cassette, and sheets in the cassette are separated and fed one by one by operation of a separation claw and a sheet feed roller 103. The sheet is guided to a registration roller pair 106. Numeral 104 denotes a manual placement guide, and sheets are guided one by one to the registration roller pair 106 via a roller pair 105. Numeral 108 is a sheet stack device (of a deck type) having an intermediate plate 108a is elevated by a motor or the like, in which sheets stacked over the intermediate plate 108a are separated and fed one by one through operation of a feed roller 109 and a separation claw and guided to a transport roller pair 110.

Numeral 112 denotes a photosensitive drum, numeral 114 denotes a developing device, numeral 115 denotes a transfer charging device, and numeral 116 denotes a separation charging device. These members constitute an image forming section.

Numeral 117 denotes a transport belt for transporting the sheet materials carrying images, numeral 118 denotes a fixing device, numeral 119 denotes a transport roller, and numeral 120 denotes a flapper. An imaged sheet material is guided by the flapper 120 to a discharge roller pair 121 and is the transported into a sorter 122. The sorter 122 has a non-sort tray 122*a*, sort bin trays 122*b*, a non-sort tray discharge roller 122*c*, and a sort bin tray discharge roller 122*d*. The non-sort tray 122*a* and the sort bin trays 122*b* are moved up and down to sort the sheets in units of one bin. Depending on the case, discharge trays are attached in lieu of the sorter.

In duplex copying or multiplex copying, an image-fixed sheet is diverged by the flapper 120 and transported by a transport roller 201; and in the double-sided copying, the sheet is discharged to an intermediate tray 200 via belts 202 and 204, a path 206, and a discharge roller pair 205. In the multiplex copying, the sheet is guided by a flapper 203 along the direction of an arrow 207 and is then discharged to the intermediate tray 200. Numerals 209 and 210 are individually denote semicircular rollers for feeding the sheet; numeral 211 denotes a separation roller pair 211; and numerals 213, 214, and 215 individually denote transport rollers for transporting the sheet to the registration roller 106.

(ADF (Auto Document Feeder))

The ADF 2 severing as an open/close unit has a platen glass 161 provided, as an original base plate, above the reader section 150 to be openable or closable with respect to the original base glass 3 via hinge mechanisms 95 and 96. The ADF 2 will now be described in detail hereinbelow with reference to the drawings.

(Original Tray Section)

Referring to FIG. 1, an original tray 4 is used to stack sheet originals P. The original tray 4 has a side guide pair provided as width-direction restraint plates to be slidable in the width direction. The side guides restrains the width direction of the originals P stacked on the original tray 4, thereby enabling stability during transport to be secured.

(Separation Section)

A feed roller 5 is provided above the original tray 4. The feed roller 5 is rotated in association with rotational driving of a separation transport roller 8 to feed sheet originals.

Ordinarily, the feed roller 5 is positioned in a standby position or a home position in an upper portion (position indicated by dotted line) not to impede original setting operation. Upon start of the sheet feed operation, the feed roller 5 is moved down to the position indicated by a solid line and is abutted against the upper surface of the original P. The feed roller 5 is axially supported by arms (not shown), so that the feed roller 5 can be vertically moved by pivotably moving the arms.

A separation pad 6 is disposed on the side opposite the separation transport roller 8, thereby applying pressure to the side of the separation transport roller 8. The separation pad 6 is formed from a material such as a rubber material slightly less frictional than the separation transport roller 8. Thereby, originals P fed via the feed roller 5 are handled one by one to be fed via the separation transport roller 8.

(Transport Section)

A registration roller 12 and a registration driven roller 11 (which hereinbelow will be referred to a "registration roller pair 11 and 12") together constitute registration means that aligns the leading edges of fed originals at the separation section. Specifically, the separated leading edge of the original is abutted against a nip portion of the registration roller pair 11 and 12 to cause the original to form a loop, thereby aligning the leading edge.

Subsequently, the original is transported toward the platen glass 161 by a lead roller 22 and a lead driven roller 14. The original transported onto the platen glass 161 is then driven out onto a jump platform 162, and is further transported by a lead discharge roller 23 and a lead discharge driven roller 16.

Upon completion of an image read, the original is discharged by a discharge roller 18 to a discharge tray 10.

In the duplex mode, an original is fed back in a switch-back manner without being discharged by the discharge roller 18, is guided to a paper path located in an upper portion, and is then transported to the registration roller pair 11 and 12. Upon arrival at the registration roller pair 11 and 12, the reverse side of the original is read in a manner similar to the above.

(Drive System)

A drive system for driving, for example, the individual rollers will be described hereinbelow with reference to FIG. 5.

A separation motor 50 (M1) is a stepping motor, and separation/transport of the original is performed through forward/reverse rotation thereof.

When the separation motor 50 is rotated in the feed direction, the feed roller 5 is moved down from the upper portion or home position (position shown by a dotted line in the drawing) and is then brought into press contact with the top of sheet originals stacked on the original tray 4. Concurrently, the feed roller 5 and the separation transport roller 8 are driven.

When the separation motor 50 is rotated in the transport direction opposite the feed direction, the feed roller 5 is maintained in the upper position (position shown by the dotted line in the drawing). Concurrently, the registration roller 12 is driven.

A lead motor 51 (M2) is a stepping motor for driving the lead roller 22, a platen roller 24, the lead discharge roller 23, and the discharge roller 18. The rollers are each driven at a speed for reading images of the originals that are transported.

A separation solenoid 57 brings a driven roller of the discharge roller 18 into engagement or disengagement at the time of switch-back of a double-sided original.

(Sensors)

Each sensor will be described hereinbelow with reference to FIG. 5.

The original tray 4 has an original set sensor 40 for sensing that an original P is set. This sensor performs sensing in the manner that a photo-interrupter is blocked from light by making use of oscillatory movement of a flag.

A paper-width sensor 44 is provided below the original tray 4 to detect the position of the side guide, thereby sensing the width (width-wise length) of a stack of originals P having been placed over the original tray 4.

A registration sensor 7 for sensing the original in the manner that a photo-interrupter is blocked from light by making use of oscillatory movement of a flag is provided between the separation transport roller 8 and the registration roller 12. The registration sensor 7 senses the leading edge of the original separated and transported, and senses timing or the like for controlling the quantity of abutment on the registration roller 12 (loop amount).

A lead sensor 13 for sensing the original in the manner that a photo-interrupter is blocked from light by making use of oscillatory movement of a flag is provided in a portion immediately after the lead roller 22. The lead sensor 13 produces a signal that is used as a reference signal for image-read start timing at an original read position 160.

A discharge sensor 17 for sensing the original in the manner that a photo-interrupter is blocked from light by making use of oscillatory movement of a flag is provided in a portion immediately before the discharge sensor 18. The discharge sensor 17 senses discharge timing or the like.

(Feed operation)

When an original P or a set of originals P on the original tray 4 is sensed by the original set sensor 40, the feed roller 5 is moved down and abutted against the original P or the stack of originals P.

When copying conditions are input and when a start key is then depressed on an operation section of the copying machine, the original size is sensed by the paper-width sensor 44 on the original tray 4. Additionally, upon resetting of holding by the separation solenoid 57, the original receives a feed force of the feed roller 5 and is advanced downstream.

The originals P advanced from the original tray 4 are separated and transported downstream one by one.

The originals P traveled through the separation section are aligned by the registration roller 12 for their leading edges, and are then transported.

In the state that the first optical base 159 is positioned at the original read position 160, the leading edge reaches the lead roller 22, the original P is transported to the platen glass 161. Then, while being transported by the platen roller 24 and the lead discharge roller 23, the image is read.

Upon completion of the image read, the original P is stacked by the discharge sensor 18 onto the discharge tray 10.

In the duplex mode, the original P is not discharged by the discharge sensor 18, but is transported back in the switchback manner and is guided to the upper paper path for transportation toward the registration roller pair 11 and 12. Upon arrival at the registration roller pair 11 and 12, the reverse side of the original P is read in a manner similar to the above.

(Blocks of Control Circuit)

Referring to FIG. 4, the control circuit is configured with a microprocessor 54 (CPU) in the center. An input/output port of the CPU 54 is connected to various loads, i.e., drive circuits, and sensor signals.

In addition, the control circuit has a RAM backed up with a battery (not shown) and a ROM in which control sequence software is stored. Numeral 55 denotes a communication IC used to control data communication with the copying machine main body 56.

The separation motor 50 and the lead motor 51 are driven by individual stepping motor drivers. The drivers each input a phase exciting signal and a motor current control signal from the CPU 54.

The separation solenoid 57 is driven by a driver, and performs operation controlled by the signals connected to the input/output port of the CPU 54.

The sensors, such as the registration sensor 7, the set sensor 40, the lead sensor 13, a discharge sensor 17, and the tray-width sensor 44 are connected to the input port of the CPU 54. These sensors are used to monitor behaviors of originals and movable loads.

(Configuration of Reading Section)

The reading section will be described hereinbelow with reference to FIGS. 6A, 6B, and 7.

Numeral 161 denotes the platen glass serving as the original base plate, and an EC coating (transparent electroconductive coating) is applied onto the glass surface of the platen glass. Numeral 26 denotes an aluminum sheet pasted via a conductive double-sided tape onto a portion from the glass surface of the platen glass 161 to the reverse side thereof. A resin sheet for protecting the aluminum sheet is pasted on the aluminum sheet on the obverse side of the platen glass.

Numeral 24 denotes the platen roller of a white color, which servers as a transport rotary member. The platen roller 24 is formed such that a high reflectance member (i.e., a member with high reflection efficiency) such as white rubber is wound on an axis in the longitudinal direction. The platen roller 24 is driven by the lead motor 51 to rotate around the axis in the center in the original transport direction. In addition, the platen roller 24 is positioned on the side opposite the first optical base 159 in the original read position 160, whereby the rear-side luminance level is stabilized when the original is read.

Numeral 27 denotes a platen holder as a supporting member formed of a high reflectance member (i.e., a member with high reflection efficiency), such as a white resin. Both ends of an axis of the platen roller 24 are rotatably journaled or axially supported by bearings engaged onto the platen holder 27. Referring to FIG. 7, the platen holder 27 is provided to cover the platen roller 24 for the overall length in the longitudinal direction. Thereby, the reflectance on the rear side of the platen roller 24 is increased to stabilize the luminance level in peripheral portions of the read position. Since each of the platen roller 24 and the platen holder 27 is formed by a high reflectance member, the luminance level is stabilized in peripheral portions of the read position and the readable region is enlarged.

Numeral 32 denotes restraint ribs serving as gap forming sections provided in both longitudinal end portions of the platen holder 27 and concurrently outwardly of the white rubber of the platen roller 24 (FIG. 7). As shown in FIG. 6B, the restraint rib 32 is circular and concentric with the platen roller 24 and to be 0.15 mm larger in diameter than the platen roller 24. The restraint rib 32 is pushed by a biasing force of below-described biasing means to be in contact with the platen glass 161, whereby a gap t between the platen roller 24 and the platen glass 161 is restrained to 0.15 mm.

The arrangement of maintaining the gap between the platen roller 24 and the platen glass 161 to the predetermine gap t avoids such a conventional problem as that the light quantity is reduced as an original is shifted from the center of the platen roller 24. This occurs for the reason that, for example, the since the gap is excessively large, bending occurs with the original being transported over the platen glass 161, or the original being transported in close contact with the roller follows the curvature of the roller.

Numeral 25 denotes a sheet biasing roller serving as a restraint member and formed of high reflectance member (i.e., a member with high reflection efficiency) such as a high-slidability white resin. The sheet biasing roller 25 is provided on a fixed axis extending through the platen holder 27 and is formed to passively rotate on the axis upon being in contact with the original. In this case, the sheet biasing roller 25 is supported by the platen holder 27, so that the restraint rib 32 is brought into press contact with the platen glass 161. Thus, according to the present embodiment, the gap between the sheet biasing roller 25 and the platen glass 161 is guaranteed to be 0.8 mm. It is sufficient to provide at least one sheet biasing roller 25 on the fixed axis extending through the platen holder 27. Alternatively, there may be provided a plurality of rollers having a predetermined axial width.

Numeral 28 denotes a white film that is made of a polyester film serving as a reflective member and that is pasted to be substantially horizontal relative to the platen glass 161 when the restraint rib 32 is brought into press contact with the platen glass 161. By providing the white film 28 between the sheet biasing roller 25 and the platen roller 24, the white film 28 is also enabled to exhibit a function as a guide member that guides to the platen roller 24 the original transported from the side of the sheet biasing roller 25. To provide a plurality of sheet biasing rollers 25 in the axial direction, the configuration is preferably arranged such that the white film 28 is provided to extend between the adjacent sheet biasing rollers 25. In more specific, the white film 28 is preferably configured into a comb shape (comb-teeth shape) structure, for example.

Numeral 30 is a pivotable arm provided as an arm member pivotably with an axis of the lead roller 22 as a pivotal center. The pivotable arm 30 is provided at each of two ends of the platen holder 27; that is, two pivotable arms 30 are provided to support the two ends of the platen holder 27. One of the pivotable arms has an engagement opening to be engaged with a boss 31 provided to the platen holder 27.

Numeral 29 is a torsion spring coil serving as biasing means is structured such that the axis of the lead roller 22 is used as a guide bar, a fixed axis is hooked on a hook portion of a base frame 33, and a work axis is hooked on the pivotable arm 30. A biasing force of the torsion spring coil 29 biases the pivotable arms 30 to the side of the platen glass 161.

At this time, since the platen holder 27 is fitted with the pivotable arm 30, also the platen roller 24, the sheet biasing roller 25, and the white film 28 are integrally supported with the ADF 2 pivotably. As such, when the ADF 2 is closed, the restraint rib 32 is abutted against the platen glass 161, whereby the positional relationship among the platen roller 24, the sheet biasing roller 25, and the white film 28 can be fixed constant at all times.

The restraint rib 32 may be of a type that restrains (maintains) the predetermined gap between the platen roller 24 and the platen glass 161. More specifically, the object with which the restraint rib 32 is abutted against is not limited to the platen glass 161, but may be a package constituting the reader section 150.

Thus, according to the present embodiment, the restraint rib 32 is provided, and the gap between the platen roller 24 and the platen glass 161 is restrained (maintained) to the predetermined gap. The arrangement described above avoids problems in that the light quantity is reduced as an original is shifted from the center of the platen roller. This occurs for the reason that, for example, bending occurs with the original being transported over the platen glass 161 or the original being transported in close contact with the roller follows the curvature of the roller. Further, the platen holder 27 is provided with the high reflectance surface condition, so that the luminance level in peripheral portions of the read position can be maintained to a luminance level suitable for read operation.

The sheet biasing roller 25 is provided upstream of the platen roller 24 in the transport direction and serves to restrain the original to be substantially horizontal with respect to the platen glass 161. This enables the original to be prevented from floating and hence brings the original into a stable state, consequently enabling the readable range of the image information of the original to be widened. In addition, at least the surfaces of the platen roller 24, the platen holder 27, the sheet biasing roller 25, and the white film 28 are each formed of the high reflectance member (member with high reflection efficiency), such as a white member. This enables the region for stabilizing the luminance level in peripheral portions of the read position to be enlarged.

The above arrangement enables the read position to be set regardless of nonuniformities in, for example, the read position associated with nonuniformity in the position of the platen roller 24 caused by open/close operation of the ADF 2 and nonuniformity in the termination accuracy of the read device (first optical base 159). Consequently, high quality image read can be implemented at all times.

The platen holder 27 is configured to include the platen roller 24, the sheet biasing rollers 25, and the white film 28, so that the read region can be made to a minimum necessary width. This enables the implementation of the image reading apparatus capable of providing compact, high quality images.

According to the present invention, the luminance level in portions near the read position can be maintained to a luminance level suitable for the read operation, consequently enabling implementation of the image reading apparatus capable of providing high quality images. Furthermore, the luminance level in peripheral portions of the reading section can be stabilized to prevent image quality nonuniformity.

What is claimed is:

1. An image reading apparatus having an original transport unit, and having an image reading unit which reads an image of an original that is transported by the original transport unit comprising: the original transport unit comprising:

a transport rotary member provided opposite an original base plate to transport the original, a supporting member which rotatably supports the transport rotary member, a rotary guide member, provided on the supporting member at an upstream side of the transport rotary member, configured to guide the original which is transported on the original base plate, a guide member, provided on the supporting member between the transport rotary member and the rotary guide member, configured to guide the original to the transport rotary member, and a gap forming section, provided on the supporting member, configured to form a gap between the transport rotary member and the original base plate, a gap between the rotary member and the original base plate and a gap between the guide member and the original base plate;

wherein the transport rotary member and the guide member each have a high reflectance surface condition.

2. An image reading apparatus according to claim 1, wherein the rotary guide member is rotated by the conveyed original.

3. An image reading apparatus according to claim 1, in which the original transport unit is openable and closable with respect to the image reading unit, and the supporting member is pivotably held on the original transport unit, wherein, when the original transport unit is open with respect to the reading unit, the supporting member and the transport rotary member are separated from the reading unit, and when the original transport unit is closed with respect to the reading unit, the gap forming section is abutted against the original base plate to form the gap between the transport rotary member and the original base plate.

4. An image reading apparatus according to claim 1, wherein the supporting member has a high reflectance surface condition.

5. An image reading apparatus according to claim 1, wherein the original transport unit has a rotary feed member that feeds the original to the original base plate, the original transport unit comprises an arm member for holding the supporting member pivotably about a rotation axis of the feed rotary member as a pivotal center, and biasing means for biasing the supporting member toward the original base plate, wherein the original transport unit is provided openably/closably with respect to the image reading unit; and when the original transport unit is closed to the image reading unit, the supporting member is biased by the biasing means toward the original base plate and the gap forming section is abutted against the original base plate, whereby the gap is formed between the transport rotary member and the original base plate.

6. An image forming apparatus comprising:

the image reading apparatus according to claim 1; and an image forming section for forming an image on a sheet in accordance with the image information of the original read by the image reading apparatus.

7. An image reading apparatus according to claim 1, wherein the guide member is extended in a direction of a rotating axis of the transport rotary member and is adjacent to the transport rotary member.

8. An image reading apparatus according to claim 1, wherein the reading unit has the original base plate, and the gap forming section has a projecting portion that is abutted against the original base plate to form the gap between the transport rotary member and the original base plate.

9. An image reading apparatus according to claim 1, wherein the rotary guide member has a high reflectance surface condition.

10. An image reading apparatus according to claim 9, wherein the surfaces of the transport rotary member, the guide member, and the rotary guide member are white.

11. An image reading apparatus according to claim 9, wherein the surface of each of the transport rotary member, the rotary guide member, and the guide member is white.

12. An image reading apparatus according to claim 1, wherein the original transport unit has a rotary feed member that feeds the original to the original base plate.

* * * * *